United States Patent [19]

Handke et al.

[11] 4,328,960
[45] May 11, 1982

[54] FLUID DAMPING UNIT FEATURING COMBINED FLUIDIC AND SPRING DAMPING CHARACTERISTICS

[75] Inventors: Gunther Handke, Euerbach; Robert Eusemann, Bergrheinfeld; Felix Wössner, Schweinfurt, all of Fed. Rep. of Germany

[73] Assignee: Fichtel & Sachs AG, Schweinfurt, Fed. Rep. of Germany

[21] Appl. No.: 8,513

[22] Filed: Feb. 1, 1979

[30] Foreign Application Priority Data

Feb. 16, 1978 [DE] Fed. Rep. of Germany ....... 2806541

[51] Int. Cl.$^3$ ............................................. F16F 13/00
[52] U.S. Cl. .................................. 267/8 R; 188/284; 267/34; 267/64.15; 280/708; 280/724
[58] Field of Search .............. 188/284, 285; 267/8 R, 267/34, 151, 150, 136, 64 B, 65 K; 280/120, 724, 708, 709, 702; 16/52

[56] References Cited

U.S. PATENT DOCUMENTS

| | | | |
|---|---|---|---|
| 1,605,798 | 11/1926 | Crombrugge | 267/8 R |
| 2,729,308 | 1/1956 | Koski et al. | 267/8 R X |
| 2,742,112 | 4/1956 | Wessel | 188/284 |
| 3,801,085 | 4/1974 | Sandor | 267/34 X |

FOREIGN PATENT DOCUMENTS

| | | |
|---|---|---|
| 681818 | 3/1964 | Canada ............................... 188/284 |
| 6901747 | 12/1968 | Fed. Rep. of Germany . |
| 1430494 | 4/1970 | Fed. Rep. of Germany . |
| 2143181 | 10/1977 | Fed. Rep. of Germany . |
| 1094390 | 12/1954 | France ................................. 188/284 |
| 763557 | 12/1956 | United Kingdom . |
| 887191 | 1/1962 | United Kingdom . |
| 1411219 | 10/1975 | United Kingdom . |
| 1489350 | 10/1977 | United Kingdom . |

*Primary Examiner*—George E. A. Halvosa
*Attorney, Agent, or Firm*—Toren, McGeady and Stanger

[57] ABSTRACT

A fluidic damping mechanism including a cylinder, a piston rod and a piston dividing the interior of the cylinder into a pair of working chambers is arranged to include within one of the working chambers a composite damping structure which imparts damping characteristics derived from the combined action of a mechanical spring mechanism and fluid throttling components.

5 Claims, 5 Drawing Figures

FLUID DAMPING UNIT FEATURING COMBINED FLUIDIC AND SPRING DAMPING CHARACTERISTICS

BACKGROUND OF THE INVENTION

The present invention relates generally to fluidic damping devices and more particularly to a fluid damping unit which may be utilized either as a shock absorber or as a telescopic strut.

Devices of the type to which the present invention relates usually comprise a cylinder, a piston rod inserted into the cylinder from an end thereof through a guiding and sealing unit, and a piston which is fastened to the piston rod near the inner end of the piston rod and which divides the interior of the cylinder into two work chambers, namely an annular work chamber which borders the guiding and sealing unit, and a work chamber at the bottom of the cylinder which borders that end thereof which is located opposite the guiding and sealing unit. A fluid charge is provided in the cylinder and, in the case where a liquid charge is utilized, a compensating volume bordering the liquid charge is provided. The piston rod is arranged to be moved reciprocally between an inner end position, in which the rod is retracted in the cylinder to the extent possible, and an outer end position in which the rod is fully extended out of the cylinder. In the operation of such a device, a damping effect is produced, beginning at a predetermined intermediate position between the inner end position and the outer end position, as a result of increased resistance created by a pull stopping unit accommodated in the annular work chamber which counteracts the movement of the piston rod out of the cylinder in the direction toward the outer end position.

The term "pull stopping unit" derives from the fact that this unit is effective as a stop device or as a brake, when the cylinder is held stationary and the piston rod is pulled out of the cylinder.

Such a fluid damped unit is known from German Utility Model No. 6,901,747. In the known unit, increase of the resistance to movement of the piston rod when it is approaching the outer end position results exclusively from a mechanical spring which is compressed during this approach movement between a sealing and guiding unit, on the one hand, and the piston rod, on the other hand.

The invention is directed to the task of providing an improved fluid damped unit of the aforementioned type which will effect braking of the piston rod as smoothly and quietly as possible during the approach of the piston rod to the outer end position, and which will do so under different operating conditions including the case involving a slow extending movement of the piston rod as well as in the case involving a quick extending movement of the piston rod.

The indicated results are achieved, according to the invention, in that an increase in the resistance is obtained by utilization of a mechanical spring action as well as of a fluidic throttling action of the pull stopping unit.

SUMMARY OF THE INVENTION

In the fluid damped unit according to the invention a fluidic damping action in dependence on speed overlaps a mechanical damping action. The mechanical and the fluidic damping can be easily influenced in dependence on the intended use and the desired operating condition of the unit. It is particularly possible to obtain a smooth actuation of the pull stopping unit and a damping force characteristic without significant bends. In this manner, annoying noises are eliminated.

Structurally, the present invention may be described as a fluid damping unit, useful as a shock absorber or as a telescopic strut, comprising a cylinder, a piston rod which is inserted from one end thereof through a guiding and sealing unit into the cylinder, and a piston which is fastened to the piston rod near the inner end thereof and which divides the interior of the cylinder into two work chambers which comprise an annular work chamber bordering the guiding and sealing unit and a bottom work chamber bordering that end of the cylinder which is located opposite the guiding and sealing unit. A fluid charge is provided in the cylinder, and, in the case where the fluid charge is a liquid charge, a compensating volume bordering the liquid charge is provided. The piston rod can be reciprocally moved between an inner end position in which the piston rod is retracted into the cylinder to the full extent possible and an outer end position in which the piston rod is fully extended out of the cylinder. From a predetermined intermediate position between the inner end position and the outer end position of the piston rod, the extension of the piston rod out of the cylinder is counteracted with an increase resistance by a pull stopping unit or composite damping mechanism which is accommodated in the annular work chamber whereby the increase of resistance is the result of a combined mechanical spring action and a fluidic throttling action of said composite damping mechanism.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF PREFERRED EMBODIMENTS

Figure 1:
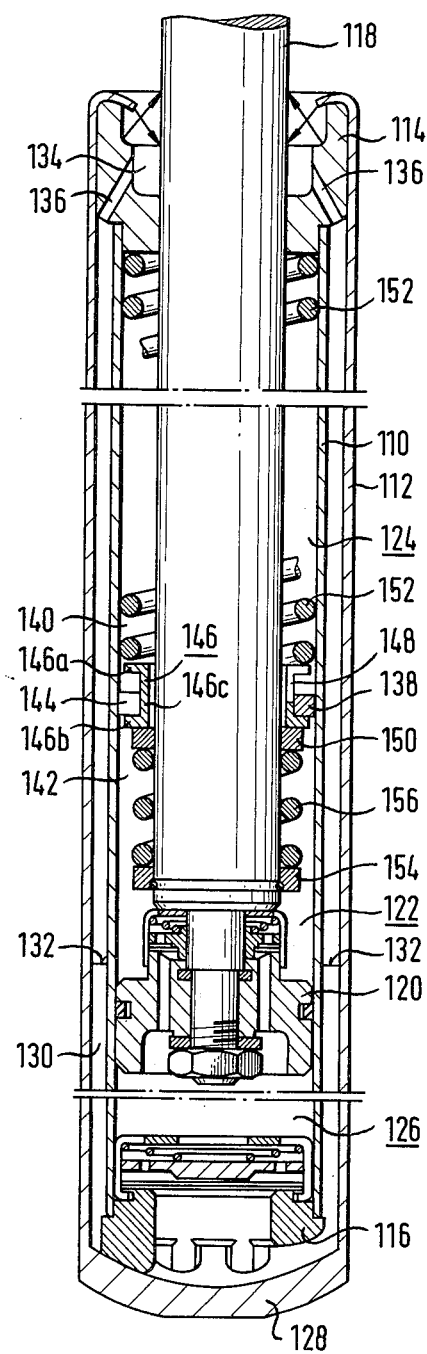
FIG. 1 is a partial sectional view of a first embodiment of the invention.

In FIG. 1, a first embodiment of the invention is depicted which comprises a cylinder 110 surrounded by an outer container tube 112. The cylinder 110 is centered at its upper end by a piston rod guiding and sealing unit 114 and, at its lower end, by a bottom valve unit 116. A piston rod 118, inserted into the cylinder 110 through the piston rod guiding and sealing unit 114, supports at its inner end a piston 120. The piston 120 divides the interior 122 of the cylinder into an annular work chamber 124 and a work chamber 126 at the cylinder bottom which borders the bottom 128 of the container tube 112. The work chamber 126 at the bottom is connected through the bottom valve unit 116 to an annular chamber 130, wherein this connection is throttled.

The piston 120 has a throttle connection between the annular work chamber 124 and the bottom work chamber 126. The interior 122 of the cylinder, consisting of the work chambers 124 and 126, is filled with liquid. The liquid charge also extends into the annular chamber 130, approximately to the level indicated by line 132. Above this level, the annular chamber 130 is filled with gas or air, possibly under pressure. A leakage liquid chamber 134 of the guiding and sealing unit 114 is connected to the annular chamber 130 through a leakage liquid duct 136. The unit described thus far operates like a conventional shock absorber or the fluid damped portion of a conventional telescopic strut.

A damping ring 138 divides the annular work chamber 124 into a first partial annular chamber 140 and a second partial annular chamber 142. The damping ring 138 is slotted in a slot 144 which acts as a damping passage. In addition, the damping ring 138 frictionally rests under spring tension against the radially inner circumferential surface of the cylinder 110. At the inner circumference of the damping ring 138, there rests a control sleeve 146 which is U-shaped in cross-section, so that the damping ring 138 has an axial play between an upper collar 146a and a lower collar 146b of the control sleeve 146. The control sleeve 146 is provided with slots 148 in the region of its upper collar 146a and in the region of its jacket 146c. The collar 146b essentially rests tightly against an actuating ring 150 which tightly surrounds the piston rod 118 but which is axially movable relative thereto.

Between the flange 146a and the guiding and sealing unit 114 there is arranged a first compression spring 152. Between the actuating ring 150 and a stop ring 154 there is arranged a second compression spring 156. The compression springs 152 and 156 are essentially released when the piston rod 118 is completely or almost completely retracted in the cylinder. The first compression spring 152 then rests on the flange 146a, while the flange 146a itself rests on the damping ring 138 and the flange 146b is lifted off the damping ring 138 downwardly by the length of the axial play. The compression spring 156 then rests on the stop ring 154 and the actuating ring 150 rests on the compression spring 156 and there is a distance between the actuating ring 150 and the flange 146b. When, in this operating position, the piston rod 118 moves reciprocally in the cylinder 110, the damping results exclusively from the effect of the throttled flow through the piston 120 and the effect of the throttled flow through the bottom valve unit 116. The damping ring 138 does not effect any additional damping, since the liquid can flow back and forth through the slots 148 essentially unthrottled.

However, when the piston rod 118 approaches its outer end position by extending upwardly out of the cylinder 110, the position according to FIG. 1 is assumed in which case an increased resistance counteracts any further extension of the piston rod. The compression spring 156 makes contact with the lower flange 146b. The control sleeve 146 is moved upwardly, so that the damping ring 138 rubbing against the cylinder rests against the lower flange 146b. The compression spring 152 is compressed. The liquid connection between the partial annular chambers 140 and 142 through the slots 148 then no longer exists; only the connection through the slot 144 is available, and thus any further extension of the piston rod 118 is damped more strongly.

Simultaneously, the compression springs 152 and 156 are increasingly compressed. When the compression spring 156 is softer than the compression spring 152, first the compression spring 156 is deformed more strongly than the compression spring 152. In this case, the damping ring 138 can only yield in the direction toward the piston 120, so that the damping resulting from the spring at first exceeds the damping resulting from the throttled fluid. When the compression spring 156 offers an increasing spring force due to increasing compression, the damping ring 138 is taken along by the piston rod 118. This has the result that the fluidic damping is increased and also that now the stiffer compression spring 152 is deformed.

When the speed of extending the piston rod is high, first the compression spring 156 will yield, since the damping ring 138 is subject to a stronger fluidic resistance and a high fluidic pressure is built up in the partial annular chamber 140. However, due to the softness of the compression spring 156, the resistance against extending the piston rod 118 at first remains relatively low. With increasing compression of the compression spring 156, more and more light is pressed through the slot 144, so that damping becomes to an increasing extent a fluidic damping, but simultaneously the elastic damping through the compression spring 152 is actuated. When the speed of extending the piston rod 118 finally decreases, the fluidic damping also decreases. The fluidic damping becomes zero when the speed of extending piston rod becomes zero.

When the piston rod 118 is again retracted in the cylinder 110, the damping ring 138 is taken along by the flange 146a, so that the slots 148 are opened and a significant fluidic damping no longer takes place. The control sleeve 146, the damping ring 138 and the slots 148 together act as a check valve which opens from the partial annular chamber 142 to the partial annular chamber 140 when the control sleeve 146 moves downwardly in FIG. 1.

The braking or stopping behavior of the unit can be adjusted by varying the slot width at the slot 144 and the springs 152, 156.

Figure 2:
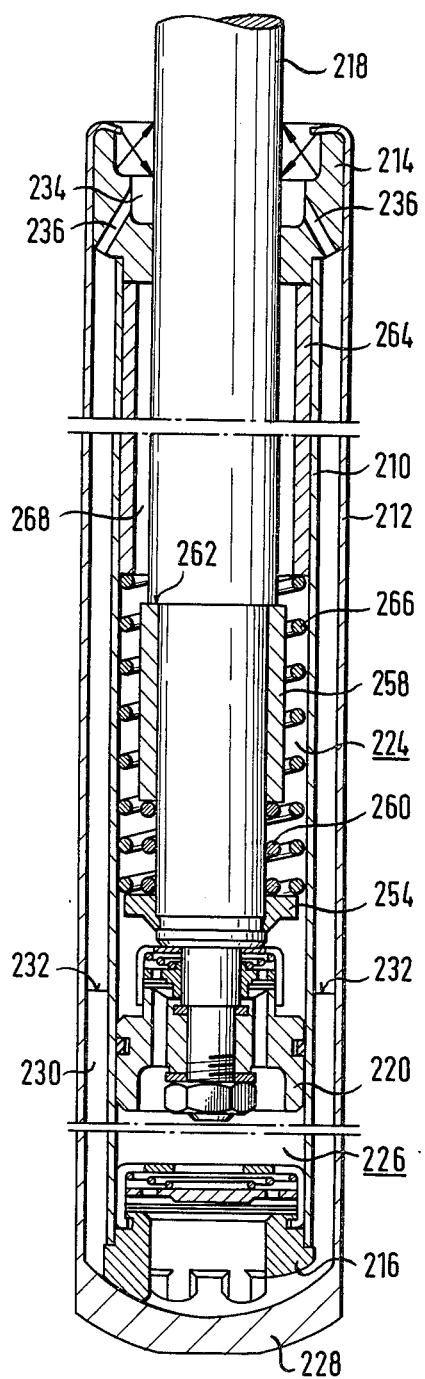
FIG. 2 is a partial sectional view of a second embodiment.

In FIG. 2, analogous parts are denoted by reference numerals similar to those of FIG. 1, increased by a factor of 100.

On the piston rod 218 there is arranged a damping sleeve 258. A first compression spring 260 supported between a stop ring 254 and the damping sleeve 258 operates to press the sleeve 258 against a stop shoulder 262 on the piston rod 218.

A damping sleeve 262 is press fitted into the cylinder 210. A second compression spring 266 is supported between the stop ring 254 of the piston rod 218 and the end of the damping sleeve 264 on the cylinder. The second compression spring 266 may be fastened to the damping sleeve 264.

When the piston rod 218 is deeply retracted into the cylinder 210, the spring 266 is completely released and a liquid-containing chamber 268 surrounded by the damping sleeve 264 in the cylinder is opened downwardly. When the piston rod 218 is extended beyond the position shown in FIG. 2, the second compression spring 266 is increasingly compressed and the outlet of the liquid-containing chamber 268 is increasingly throttled by means of the damping sleeve on the piston rod which moves into this chamber. The discharge resistance of the throttling point which is defined between overlapping parts of the damping sleeves 258 and 264 becomes larger with longer axial overlapping. Pressure is built up in the liquid-containing chamber 268, as a result of which the damping sleeve 258 on the piston rod is moved against the action of the first compression spring 260. Thus, when the piston rod 218 is quickly extended out of the cylinder 210, movement of the damping sleeve 258 on the piston rod into the liquid-containing chamber 268 is decelerated and the first compression spring 260 yields while the damping sleeve 258 is moved toward the piston 220.

Figure 3:
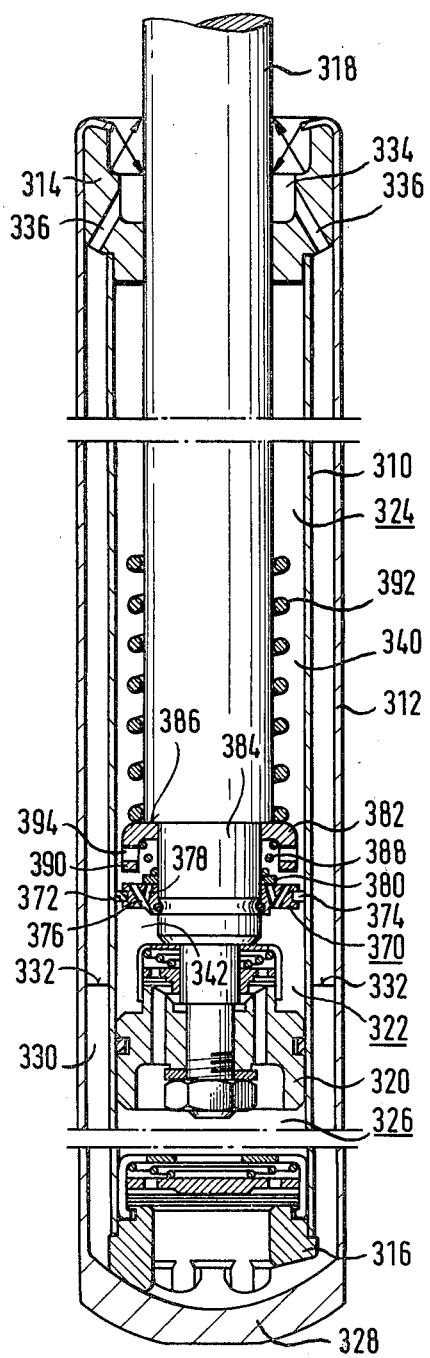
FIG. 3 is a partial sectional view of a third embodiment.

In FIG. 3, which depicts a third embodiment of the invention, analogous parts are denoted with similar reference numerals as in FIG. 1, each increased by a factor 200.

On a piston rod 318 there is mounted a flow-through disc 370 having a slotted sealing ring 372 which bears against an inner surface of a cylinder 310, the slot being denoted by reference number 374. The flow-through disc 370 has a first group of flow-through bores 376 and a second group of flow-through bores 378. The flow-through bores 378 are closed off by a valve plate 380. A cup-shaped damping member 382 is arranged axially movably on a reduced diameter portion 384 of the piston rod 318 and rests against a stop shoulder 386 of the piston rod 318. A first compression spring 388 presses the valve plate 380 against the flow-through disc 370 and also presses the cup-shaped damping member 382 against the stop shoulder 386. A collar 390 of the cup-shaped damping member is so dimensioned that it is in alignment with the upper outlets of the bores 376. On the cup-shaped damping member 382 there rests a second compression spring 392.

The flow-through bores 376 are so dimensioned that, in the operating state illustrated in FIG. 3, no significant damping is effected by the flow-through disc 370. During the further extension of the piston rod 318, when the second compression spring 392 strikes the guiding and sealing unit 314, the first compression spring 388 is compressed and the flow-through bores 376 are closed off by the collar 390 of the cup-shaped damping member 382. From the first partial annular chamber 340, the liquid can now only reach the second partial annular chamber 342 through the slot 374 of the sealing ring 372, i.e. a strong fluidic damping occurs, and, simultaneously, the second compression spring 392 must be compressed.

When the piston rod 318 is subsequently retracted again, the flow-through bores 376 are at first kept closed, since the cup-shaped damping member 382 is at first pressed against the flow-through disc 370 by the second compression spring 392. However, the bores 378 are provided to maintain reduced damping during retraction of the piston rod 318. This is so because during retraction of the piston rod 318, the valve plate 380 is lifted off the flow-through disc, so that the liquid can flow through the bores 378 and through the radial bores 394 of the cup-shaped damping member 382 from the partial annular chamber 342 into the partial annular chamber 340. Accordingly, the bores 378 form a check valve together with the valve plate 380 and the first compression spring 388.

Figure 4:
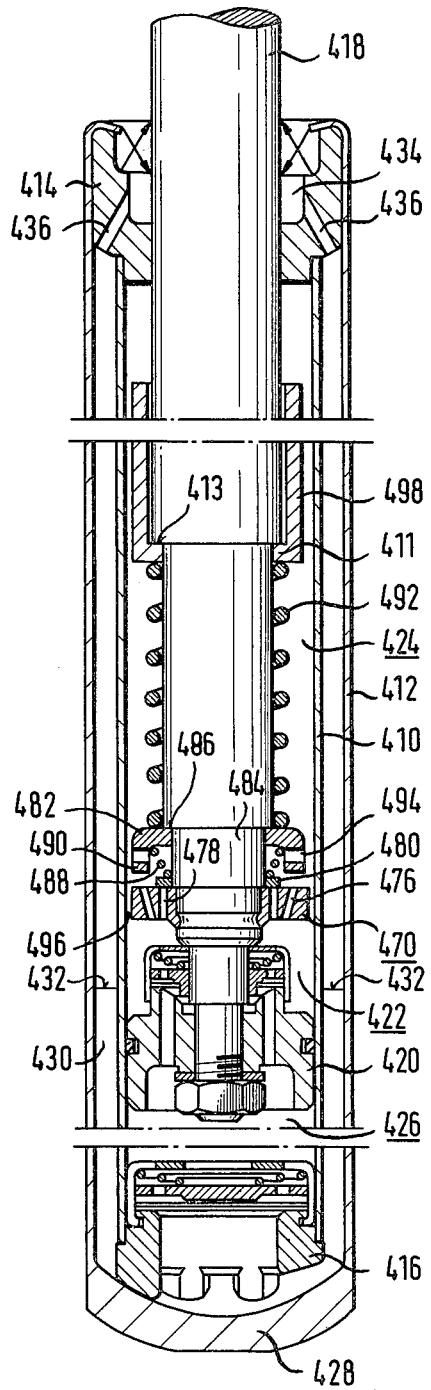
FIG. 4 is a partial sectional view of a fourth embodiment.

In the embodiment according to FIG. 4, analogous parts are denoted by similar reference numerals as in FIG. 3, each increased by a factor of 100.

The embodiment according to FIG. 4 differs from the one according to FIG. 3 merely with regard to some details. Contrary to the embodiment according to FIG. 3, a sealing ring is no longer arranged at a flow-through disc 470, but instead a slot 496 is provided between the flow-through disc 470 and the cylinder 410 which is open continuously. The second compression spring 492 is supported by a stop sleeve 498 which, with a collar 411 rests against a stop shoulder 413 at the piston rod 418. Accordingly, the second compression spring 492 is under continuous initial compression. However, this compression is not sufficient to press the damping member 482 against the flow-through disc 470. Only when the stop sleeve 498 rests against the guiding and sealing unit 414 is the second compression spring 492 compressed to such an extent that it presses the damping member 482 against the flow-through disc 470 and closes the flow-through bores 476. In all other respects, the embodiment according to FIG. 4 functions similarly to the embodiment according to FIG. 3.

Figure 5:
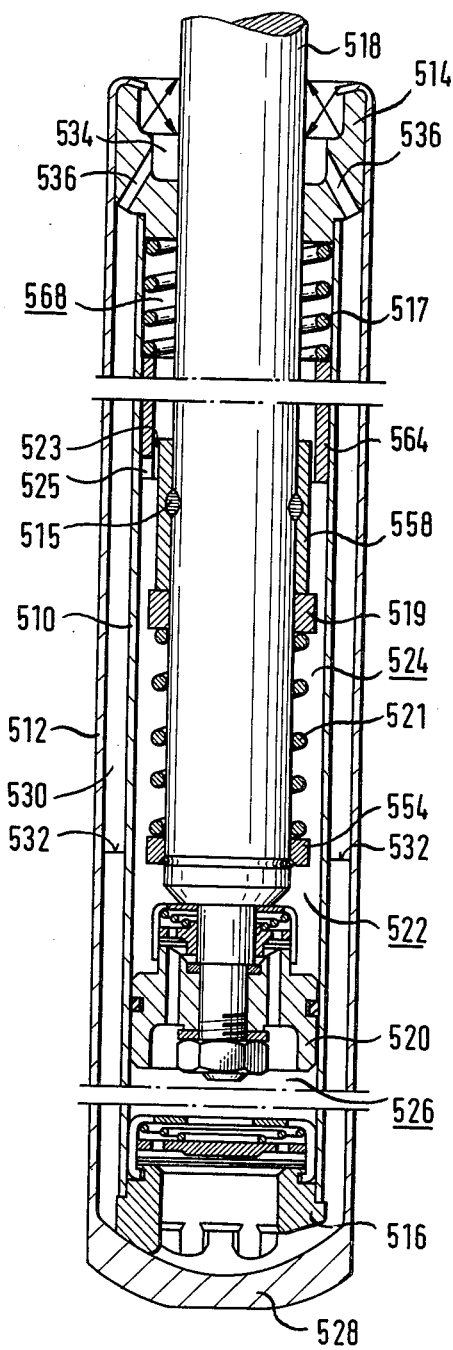
FIG. 5 is a partial sectional view of a fifth embodiment.

The embodiment according to FIG. 5 partially coincides with the embodiment according to FIG. 2, and analogous parts are denoted by similar reference numerals as in FIG. 2, each increased by a factor of 300.

In the embodiment according to FIG. 5, the damping sleeve 558 on the piston rod is axially immovably mounted on the piston rod 518 by means of a weld seam 515. The damping sleeve 564 is arranged to be axially movable in the cylinder 510, the sleeve 564 being connected to a first compression spring 517 which, in turn, is connected to the guiding and sealing unit 514. By means of a second compression spring 521, a stop ring 519 is pressed against the lower end of the damping sleeve 558 on the cylinder. The second compression spring 521 is supported by a stop ring 554 of the piston rod 518. The stop ring 519 overlaps the damping sleeve 564 on the cylinder in the radial direction.

When the piston rod 518 approaches its outer end position, the damping sleeves 558 and 564 overlap, so that a discharge gap 523 for the liquid-containing chamber 568 is created. The liquid in the liquid-containing chamber 568 is pressurized and is forced through the discharge gap 523. The resistance to flow in the discharge gap 523 increases with increasing axial overlapping of the damping sleeves. Finally, the stop ring 519 strikes the lower end of the damping sleeve 564 on the cylinder. Subsequently, in addition to the fluidic damping, a mechanical damping by compression of the compression springs 517 and 521 also becomes effective. The resistance to flow out of the liquid-containing chamber 568 now depends on the force with which the damping sleeve 564 is pressed against the stop ring 519. It is also possible to provide slots 525 in the lower border of the damping sleeve 564 on the cylinder. These slots 525 effect a constant resistance to flow from the beginning of the contact of the stop ring 519 and the damping sleeve 564.

In the embodiment according to FIG. 5, a two-step fluidic damping can be achieved. The gap 523 can be dimensioned with a width such that it effects damping only in the case of very high piston rod speeds. In this case, a significantly increased fluidic damping occurs only after the stop ring 519 makes contact with the damping sleeve 564, since the liquid can now only flow through the slots 525. The mechanical damping by compression of the compression springs 517 and 521 begins simultaneously.

The invention can also be used in so-called single-tube shock absorbers in which the compensating space is accommodated within the cylinder 510. It is also possible to provide pneumatic damping instead of hydraulic damping.

While specific embodiments of the invention have been shown and described in detail to illustrate the application of the inventive principles, it will be understood that the invention may be embodied otherwise without departing from such principles.

What is claimed is:

1. A fluidic damping unit particularly suitable for use as a shock absorber comprising: cylinder means; piston rod means operably interposed within said cylinder means for reciprocal movement between a pair of terminal positions representing, respectively, the fully extended and the fully retracted position of said piston rod means relative to said cylinder means; a guiding and sealing unit operatively mounting said piston rod means relative to one end of said cylinder means; piston means affixed to said piston rod means within said cylinder means dividing the interior of said cylinder means into a pair of fluidic working chambers, one of said working chambers being defined between said guiding and sealing unit and said piston means; and composite damping means dividing said one working chamber into a first partial chamber adjoining said guiding and sealing unit and a second partial chamber adjoining said piston means, said composite damping means operating to create a damping force applied against said piston rod means during a portion of its movement intermediate said pair of terminal positions; said composite damping means comprising throttling fluid passage means and additional fluid passage means extending between said first and said second partial chambers, a control sleeve, first spring means interposed for compression between said control sleeve and said guiding and sealing unit, second spring means interposed for compression between a fixed point on said piston rod means and said control sleeve, and a damping ring arranged in frictional sliding engagement with said cylinder means and received by said control sleeve to be axially movable with respect thereto between a pair of end positions, one of said end positions being proximate said piston means and the other end position being away from said piston means, said damping ring operating to close off said additional fluid passage means when in said one end position and to open said additional fluid passage means when in the other of said end positions.

2. A fluidic damping unit particularly suitable for use as a shock absorber comprising: cylinder means; piston rod means operably interposed within said cylinder means for reciprocal movement between a pair of terminal positions representing, respectively, the fully extended and the fully retracted position of said piston rod means relative to said cylinder means; a guiding and sealing unit operatively mounting said piston rod means relative to one end of said cylinder means; piston means affixed to said piston rod means within said cylinder means dividing the interior of said cylinder means into a pair of fluidic working chambers, one of said working chambers being defined between said guiding and sealing unit and said piston means; and composite damping means dividing said one working chamber into a first partial chamber adjoining said guiding and sealing unit and a second partial chamber adjoining said piston means, said composite damping means operating to create a damping force applied against said piston rod means during a portion of its movement intermediate said pair of terminal positions; said composite damping means comprising throttling fluid passage means extending between said first and said second partial chambers, a control sleeve, first spring means interposed for compression between said control ring and said guiding and sealing unit, second spring means interposed for compression between a fixed point on said piston rod means and said control sleeve, and a damping ring arranged in frictional sliding engagement with said cylinder means and mounted relative to said control sleeve to be axially movable with respect thereto between a pair of end positions, one of said end positions being proximate said piston means and the other end position being away from said piston means, said damping ring operating to reduce the flow cross section of said throttling fluid passage means when in said one end position and to increase the flow cross section of said throttling fluid passage means when in the other of said end positions.

3. A damping unit according to claim 1 or 2 wherein said first spring is constructed to have a greater spring stiffness than said second spring.

4. A damping unit according to claim 1 or 2 further comprising a check valve bridging said damping ring and interposed in fluid flow relationship between said first partial chamber and said second partial chamber, said check valve opening from said second partial chamber toward said first partial chamber in response to said damping ring approaching said piston means.

5. A damping unit according to claim 1 or 2 wherein said first and said second springs act on said damping ring through said control sleeve.

* * * * *